J. C. Rohrman,
Water Pipe,
No. 71,222.    Patented Nov. 19, 1867.
Fig: 1.
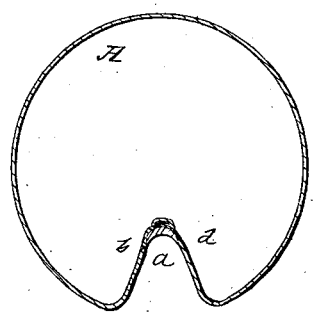
Fig: 2.
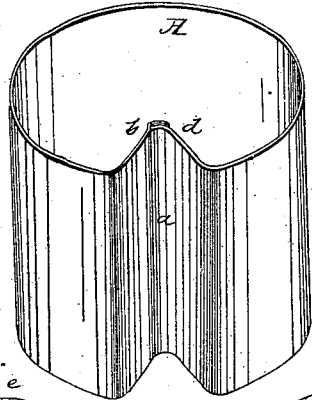
Fig: 3.    Fig: 4.
Fig: 5.
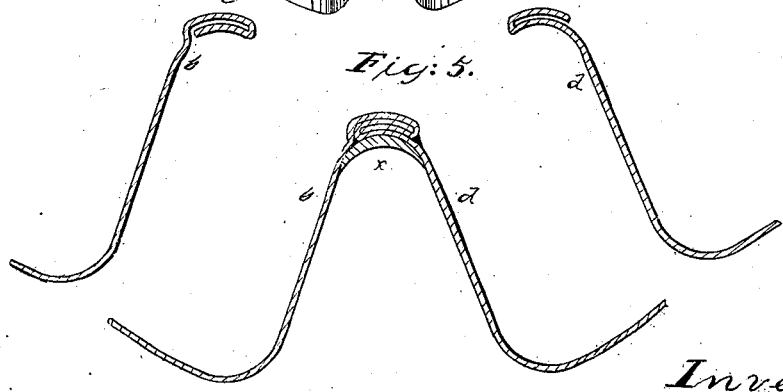
Witnesses:    Inventor

United States Patent Office.

JOHN C. ROHRMAN, OF PHILADELPHIA, PENNSYLVANIA.

Letters Patent No. 71,222, dated November 19, 1867.

IMPROVEMENT IN THE CONSTRUCTION OF CONDUCTOR PIPES.

The Schedule referred to in these Letters Patent and making part of the same.

TO ALL WHOM IT MAY CONCERN:

Be it known that I, J. C. ROHRMAN, of Philadelphia, county of Philadelphia, State of Pennsylvania, have invented an Improvement in Waste-Water Pipes; and do hereby declare the following to be a full, clear, and exact description of the same.

My invention relates to the construction of the pipes used in buildings for conveying rain-water from the gutters to the ground; and my invention consists of a pipe, having a longitudinal recess or groove, made substantially as described hereafter, by bending, lapping, and soldering the edges of the plates of which the pipe is composed, so that the said pipe may be at liberty to expand and contract to a limited extent during frosty weather, and so that the joint may be in the best condition for resisting the strain consequent upon such expansion and contraction.

In order to enable others skilled in the art to make my invention, I will now proceed to describe the mode of constructing the same, reference being had to the accompanying drawing, which forms a part of this specification, and in which—

Figure 1 represents a sectional plan of my improved waste-water pipe,

Figure 2 a perspective view of a portion of the pipe,

Figures 3 and 4 enlarged sectional plan views of parts of the pipe, and

Figure 5 the same, showing the manner of making the joint.

Similar letters refer to similar parts throughout the several views.

The pipe A is made, as usual, of thin tinned plate or plate zinc; but, instead of being entirely cylindrical, as usual, it is recessed from the exterior at $a$, so as to form a continuous groove from end to end, as shown in figs. 1, 2, and 5. This recess or groove is formed in the following manner: The plate of which the pipe is formed is first bent to a cylindrical form, and then a portion near one edge is bent inwards, as represented at $b$, a portion near the opposite edge being also bent inwards, as represented by $d$. The portion $b$ is bent at its edge to the form shown at $e$, fig. 3, for the reception of the bent edge $f$ of the portion $d$. The two bent edges $e$ and $f$ are then fitted and pressed together, so as to form a lap-joint and complete the longitudinal groove $a$, after which a mass of solder, $x$, is laid in the groove. Owing to this groove $a$, the pipe possesses the property of expanding and contracting to a limited extent without being split or fractured—an advantage not possessed by ordinary cylindrical pipes, which, owing to the freezing of the water in the interior during the winter months, are apt to be distended to an extent which causes ruptures and leakage. The solder $x$ serves the two-fold purpose of strengthening the pipe at the point where the greatest strength is needed, of making a perfectly tight joint, and resisting the tendency of the pipe to become fractured by the contraction and expansion of the same.

I claim as my invention, and desire to secure by Letters Patent—

A waste-water pipe, having a longitudinal recess or groove, $a$, made substantially as described, by bending, lapping, and soldering the edges of the plates of which the pipe is composed, for the purpose specified.

In testimony whereof I have signed my name to this specification in the presence of two subscribing witnesses.

JOHN C. ROHRMAN.

Witnesses:
C. E. FOSTER,
W. J. R. DELANY.